United States Patent
Sarin

(10) Patent No.: US 11,386,422 B2
(45) Date of Patent: Jul. 12, 2022

(54) PASSIVE MANAGEMENT OF MULTIPLE DIGITAL TOKENS FOR AN ELECTRONIC TRANSACTION

(71) Applicant: PAYPAL, INC., San Jose, CA (US)

(72) Inventor: Pankaj Sarin, Elkhorn, NE (US)

(73) Assignee: PAYPAL, INC., San Jose, CA (US)

( * ) Notice: Subject to any disclaimer, the term of this patent is extended or adjusted under 35 U.S.C. 154(b) by 178 days.

(21) Appl. No.: 16/210,713

(22) Filed: Dec. 5, 2018

(65) Prior Publication Data
US 2020/0184466 A1    Jun. 11, 2020

(51) Int. Cl.
G06Q 20/36    (2012.01)
G06Q 20/40    (2012.01)
H04L 9/06    (2006.01)
G06Q 20/22    (2012.01)

(52) U.S. Cl.
CPC ......... *G06Q 20/3678* (2013.01); *G06Q 20/29* (2013.01); *G06Q 20/405* (2013.01); *H04L 9/0637* (2013.01); *G06Q 2220/00* (2013.01)

(58) Field of Classification Search
None
See application file for complete search history.

(56) References Cited

U.S. PATENT DOCUMENTS 8,121,945 B2 * 2/2012 Rackley, III ......... G06Q 20/223
705/40
8,458,064 B1 * 6/2013 Dobbins ............ G06Q 20/108
705/35
8,554,675 B2 * 10/2013 Gupta ............... G06Q 30/0633
705/40
8,682,802 B1 * 3/2014 Kannanari .......... G06Q 20/367
705/65
2004/0215560 A1    10/2004 Amalraj et al.
2007/0255653 A1    11/2007 Tumminaro et al.
(Continued)

FOREIGN PATENT DOCUMENTS

WO    WO-0214985 A2 *    2/2002    ............ G06Q 20/02
WO    WO 2016/123309        8/2016
WO    WO 2018/175246        9/2018

OTHER PUBLICATIONS

Julien Jr., Ronald "The Cybersecurity Aspects of Apple Pay", Utica College, Dec. 2016. (Year: 2016).*

*Primary Examiner* — Neha Patel
*Assistant Examiner* — Clay C Lee
(74) *Attorney, Agent, or Firm* — Haynes and Boone, LLP

(57) ABSTRACT

Systems and methods for providing a payment system includes processing, by a first payment service provider device, a payment request received from a user device and associated with a first funding instrument. A payment request failed message associated with the payment request is received. A second funding instrument associated with a second payment service provider device is retrieved. First sub-payment request of the payment request associated with the second funding instrument is processed and a first sub-payment successful message associated with the first sub-payment request is obtained. The payment request is determined to be successful based on the first sub-payment successful message. A payment request successful message is provided to the user device indicating that the payment request was successful.

20 Claims, 13 Drawing Sheets

(56) References Cited

U.S. PATENT DOCUMENTS

| | | | |
|---|---|---|---|
| 2007/0267479 A1* | 11/2007 | Nix | G07F 17/24 |
| | | | 705/13 |
| 2008/0303811 A1 | 12/2008 | Van Luchene | |
| 2015/0199670 A1* | 7/2015 | Dheer | G06Q 20/102 |
| | | | 705/39 |
| 2017/0109748 A1 | 4/2017 | Kote | |
| 2017/0286963 A1 | 10/2017 | Prabhu | |
| 2018/0225660 A1* | 8/2018 | Chapman | H04L 9/3239 |

* cited by examiner

PASSIVE MANAGEMENT OF MULTIPLE DIGITAL TOKENS FOR AN ELECTRONIC TRANSACTION

BACKGROUND

Technical Field

The present disclosure generally relates to electronic transactions conducted over computer networks, and more particularly to managing the use of multiple digital tokens to conduct a transaction over a network according to various embodiments.

Related Art

More and more consumers are conducting electronic transactions, such as purchasing items and services, via computing devices over electronic networks such as, for example, the Internet. Consumers routinely purchase products and services from merchants and individuals alike. The transactions may take place directly between a physical or online merchant or retailer and the consumer, and payment is typically made by entering credit card or other funding source information. Transactions may also take place with the aid of an online or mobile service provider such as, for example, PayPal, Inc. of San Jose, Calif. Such service providers can make transactions easier and safer for the parties involved. Purchasing with the assistance of a service provider from the convenience of virtually anywhere using a mobile device is one main reason why online and mobile purchases are growing very quickly.

Typically, when a user requests a payment transaction (e.g., of a purchase transaction) using a particular payment application (e.g., PayPal application) provided by a payment service provider (e.g., PayPal, Inc.), a particular funding instrument already linked with that particular payment application is used for the payment transaction. When the particular funding instrument fails (e.g., because of an insufficient balance), the payment transaction fails. If the user wishes to use another funding instrument that is not already linked to that particular payment application for that payment transaction, they usually must go through the process of providing a new funding instrument to that payment application. Such inconvenience can introduce human errors from manual inputs, and discourages users from making purchases and lead to lost sales for merchants.

Thus, there is a need for improvements to conventional payment techniques for online purchase and payment transactions.

Figure 1:
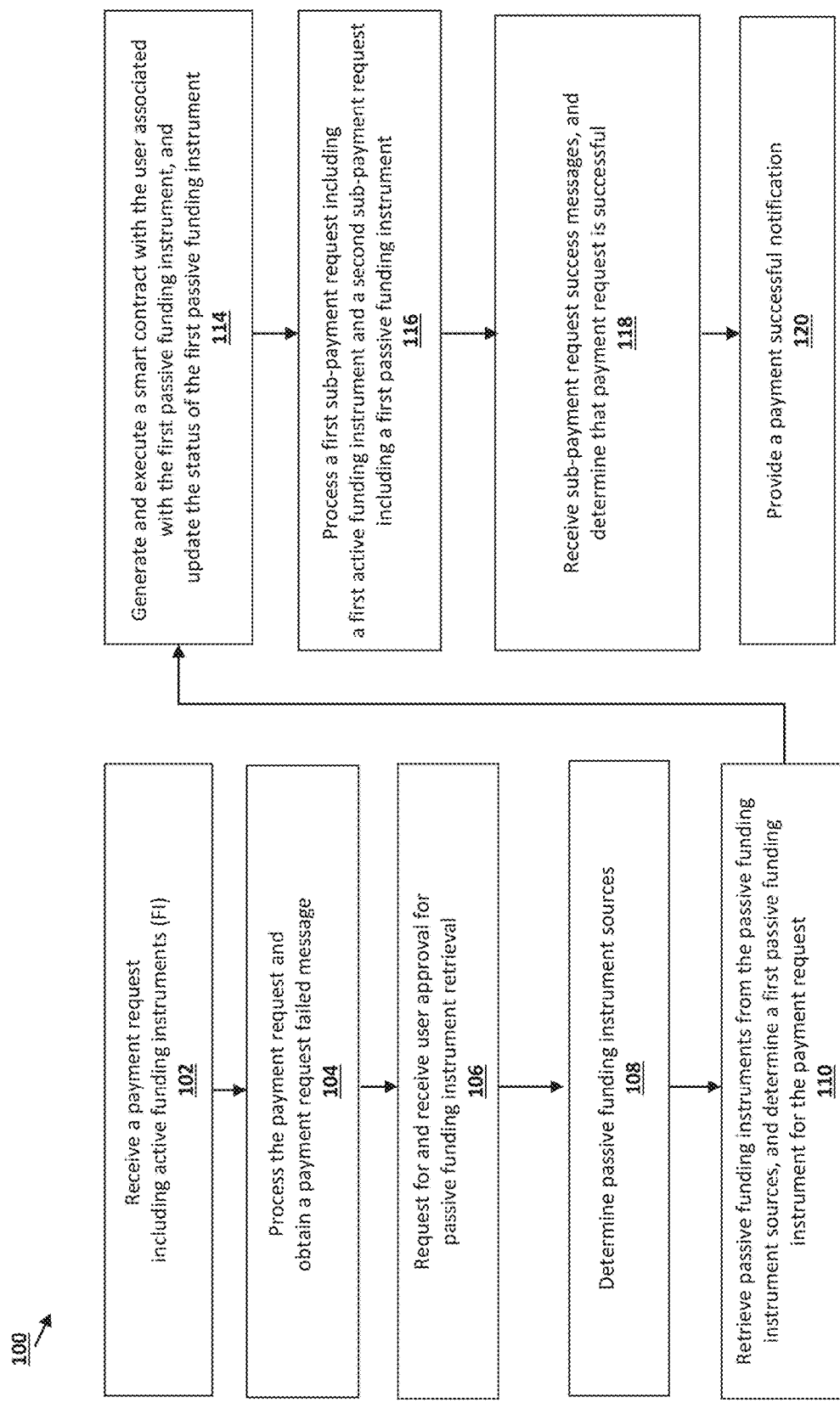
FIG. 1 is a flowchart illustrating a method for providing a payment for an electronic transaction in accordance with an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for providing secure electronic payments using both active and passive funding instruments. As discussed above, typically, in a payment application, when a payment transaction using a particular funding instrument linked to the application (an active funding instrument) fails (e.g., because of an insufficient balance), that payment transaction fails. If the user wishes to make the payment using another funding instrument that is not already linked to that particular payment application (a passive funding instrument), they usually must go through the process of providing a new funding instrument to that payment application. Such inconvenience can discourage users from making purchases and lead to lost sales for merchants. However, in embodiments of the systems and methods described herein, a system provider may retrieve passive funding instruments not linked with that payment application (e.g., using other payment applications, local storage of the user device, remote storage of the user device, etc.), and perform a payment transaction using an active funding instrument already linked with the payment application and a passive funding instrument not linked with that payment application for the single transaction without user input or action. As such, human mistakes that may occur when a user manually provides funding instruments to the payment application are reduced, and the user experience is enhanced. The payment system may use various data security techniques (e.g., encryption, tokenization, smart contract using blockchain, etc.) to improve transaction security.

Referring to FIG. 1, an embodiment of a method 100 for providing payments using active and passive funding instruments is illustrated. In the embodiments discussed below, a payment service provider such as, for example, PayPal, Inc. of San Jose, Calif. is the system provider and operates a system provider device (e.g., payment service provider device) to help the users to use, both active (i.e., already linked to the system provider or an associated device) and passive (i.e., not already linked to the system provider or an associated device) funding instruments for payment requests. However, one of skill in the art in possession of the present disclosure will recognize that a variety of other system providers such as, for example, marketplace providers, merchants, financial service providers, marketing service providers, and/or other entities will benefit from the teachings herein and thus fall within the scope of the present disclosure.

Figure 2:
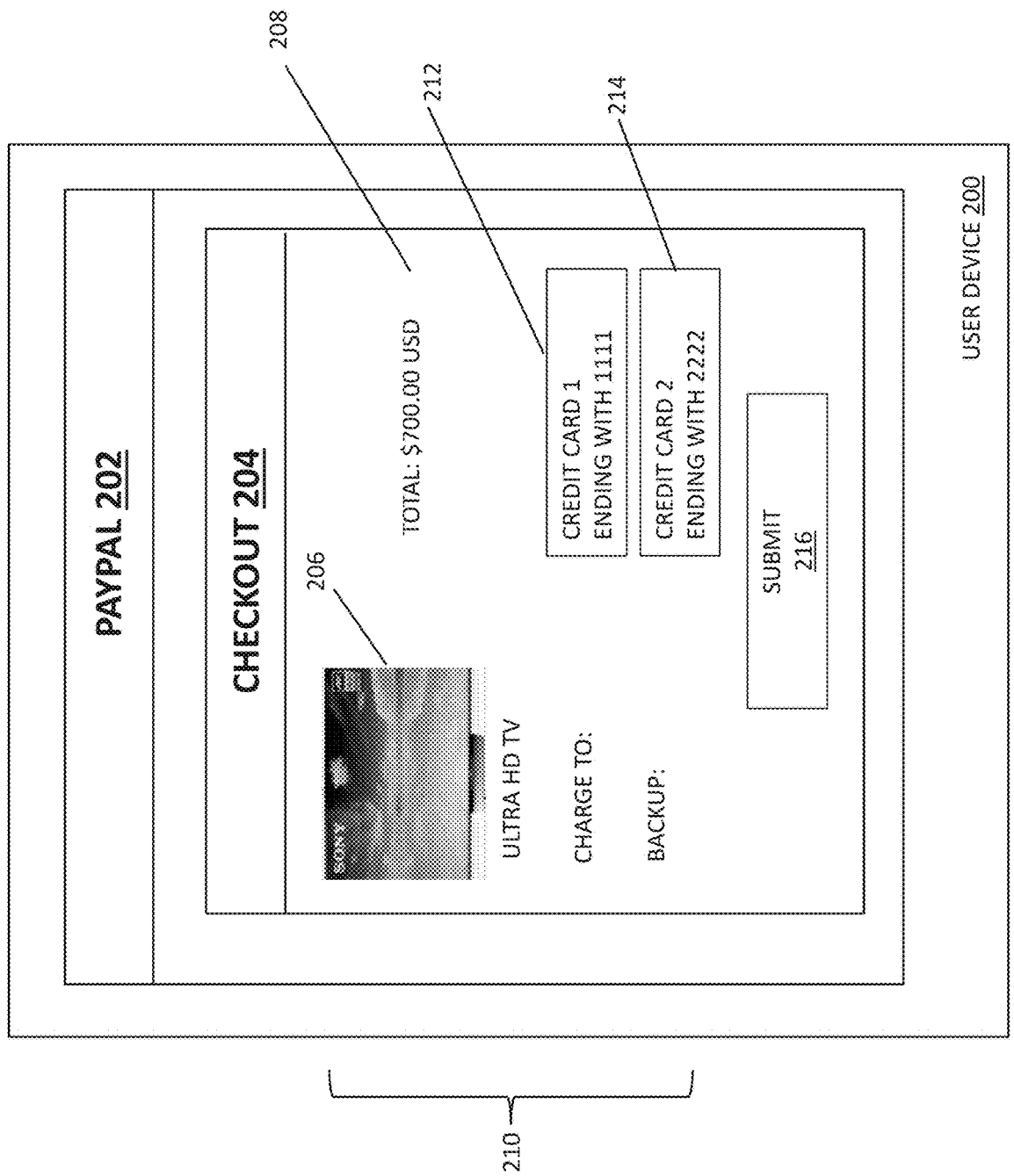
FIG. 2 illustrates a user device displaying a payment request screen in accordance with an embodiment.

Referring to FIGS. 1 and 2, the method may begin at block 102, where a system provider receives a payment request from a user device. Referring to FIG. 2, illustrated is an example of a payment request screen 204 displayed on a display device 202 of a user device 200 associated with a user. In the particular illustrated example of FIG. 2, the payment request screen 204 illustrates a checkout stage in a particular payment application (e.g., "PAYPAL"), which may be used to generate a payment request 210. The payment request 210 may be processed after the user selects the "SUBMIT" button 216. The payment request 210 requests payment for a purchase transaction of a purchase item 206 (e.g., "ULTRA HD TV"), includes an amount (e.g., "$700.00 USD") and one or more funding instruments for the payment. In the example of FIG. 2, the payment request 210 includes active funding instruments 212 and 214, both of which have been linked with the payment application (e.g., "PAYPAL") provided by the system provider device. The active funding instrument 212 (e.g., "CREDIT CARD 1 ENDING WITH 1111") may be used as a preferred payment method for making the payment first, and if there's a problem with the preferred payment method, the active funding instrument 214 (e.g., "CREDIT CARD 2 ENDING WITH 2222") is used as a backup payment method.

Figure 3:
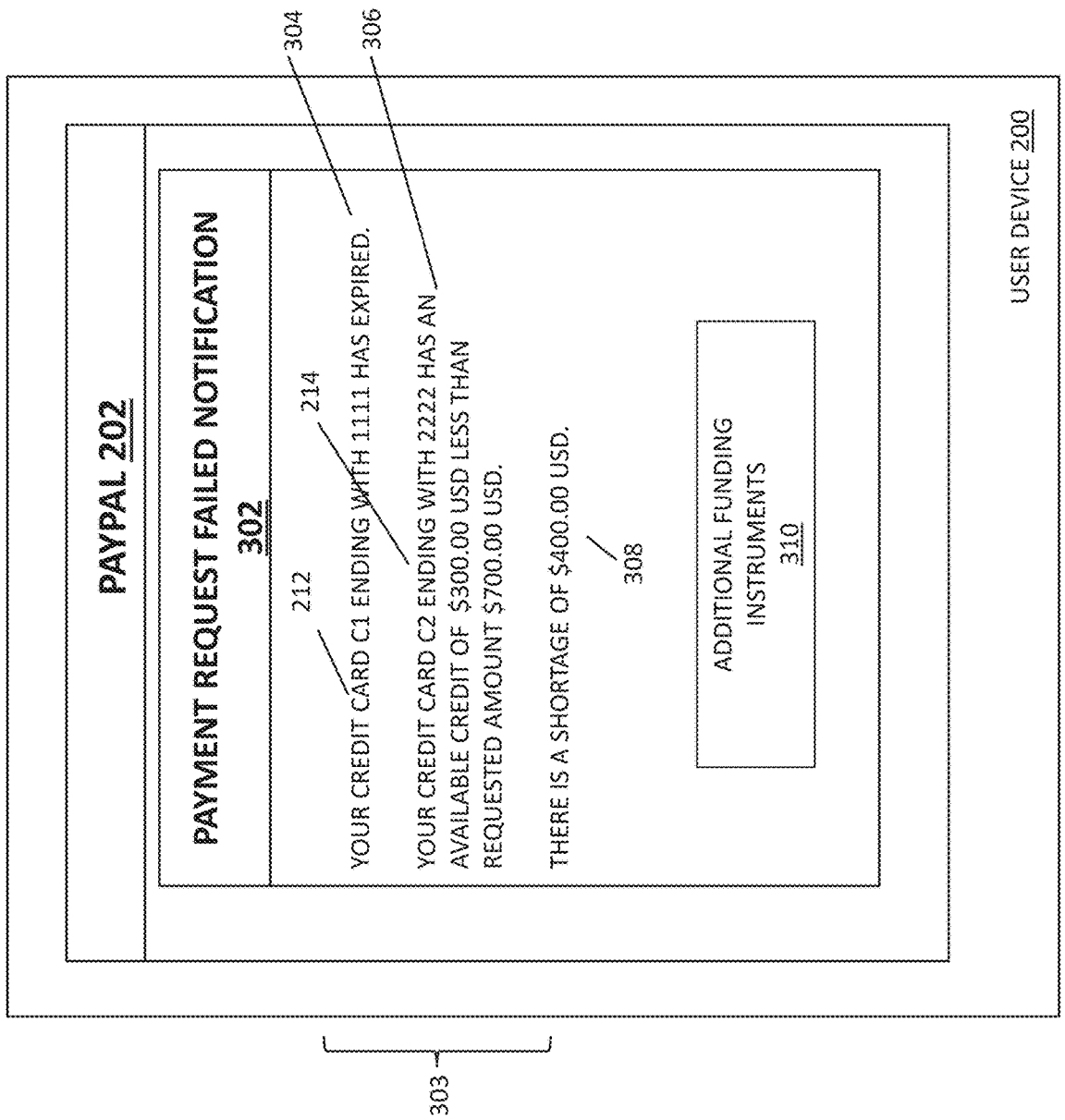
FIG. 3 illustrates a user device displaying a payment request failed screen in accordance with an embodiment.

The method 100 proceeds to block 104, where the system provider device processes the payment request, such as through a token communication along network rails of an entity linked to the funding instruments, and obtains, from the entity, a payment request failed message associated with the active funding instruments. Referring to FIG. 3, a payment request failed notification screen 302 is displayed on a display device 202 of the user device 200. The payment request failed notification screen 302 includes a payment request failed message 303, which includes active funding instrument status messages indicating the status of the active funding instruments. For example, the payment request failed message 303 includes an active funding instrument status message 304 (e.g., "YOUR CREDIT CARD C1 ENDING WITH 1111 HAS EXPIRED") indicating that the active funding instrument 212 has expired. For further example, the payment request failed message 303 includes an active funding instrument status message 306 (e.g., "YOUR CREDIT CARD C2 ENDING WITH 2222 HAS AN AVAILABLE CREDIT OF $300.00 USD LESS THAN REQUESTED AMOUNT $700.00 USD.") indicating that the active funding instrument 214 has an available credit (e.g., "$300 USD") that is less than the requested amount (e.g., "$700.00 USD"). The payment request failed message 303 also includes a shortage amount 308 (e.g., "$400.00 USD"). A user may select the button 310 (e.g., "ADDITIONAL FUNDING INSTRUMENTS") for using additional funding instruments for the payment request.

In some examples, after receiving the payment request failed message 303, a user may select button 310 ("ADDITIONAL FUNDING INSTRUMENTS") for using additional funding instruments for the payment transaction.

It is noted that while the shortage amount 308 in the example of FIG. 3 is less than the requested amount 208 because the funding instrument 214 may be available to provide a partial payment, in some examples, none of the active funding instruments of the payment request is available to provide a partial payment. In those examples, the shortage amount 308 may be equal to the requested amount 208.

Figure 4:
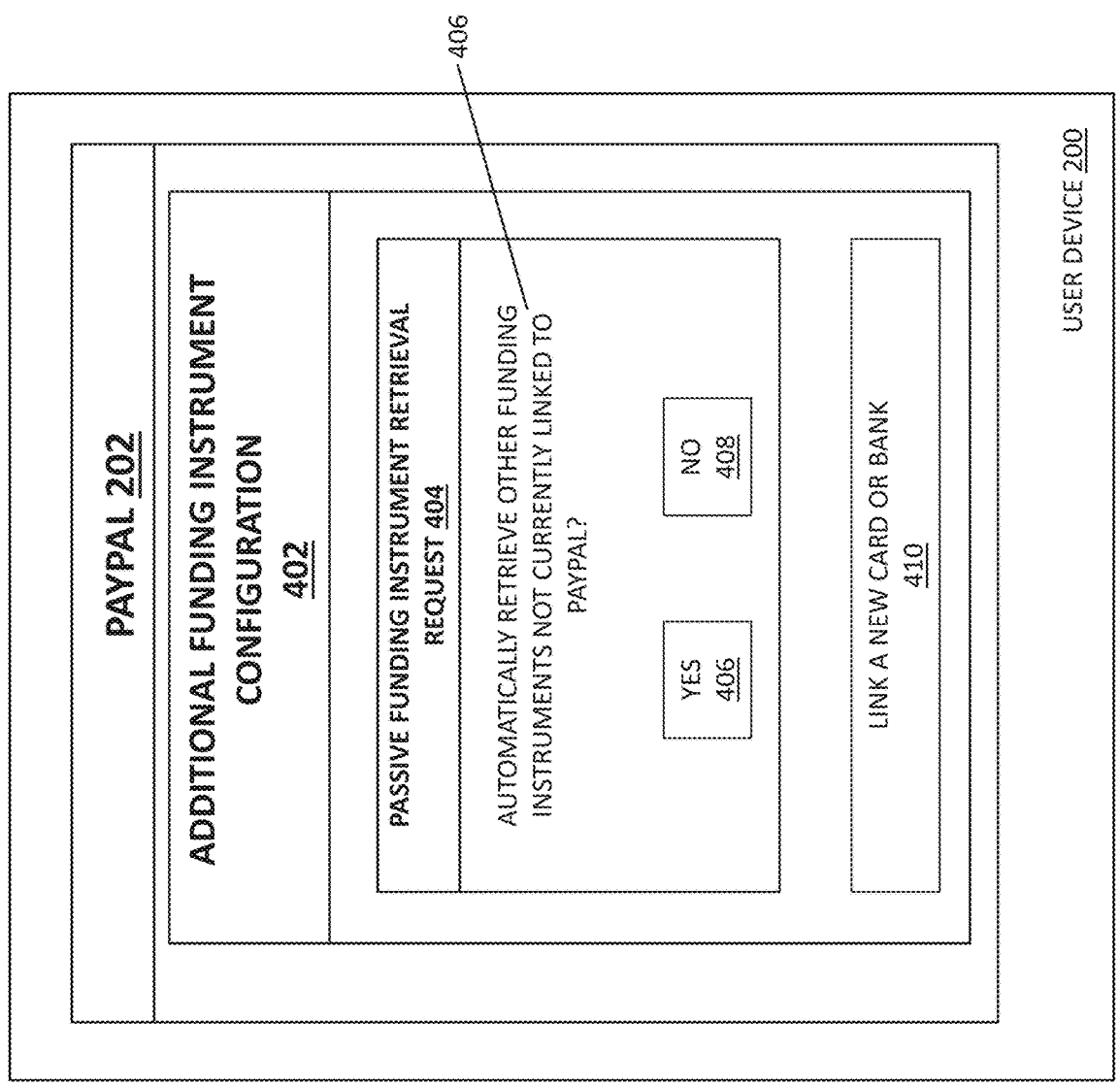
FIG. 4 illustrates a user device displaying an additional funding instrument configuration screen in accordance with an embodiment.

The method 100 may then proceed to block 106, where the system provider device requests user approval for passive funding instrument retrieval. Referring to FIG. 4, an additional funding instrument configuration screen 402 is displayed on a display device 202 of the user device 200. The additional funding instrument configuration screen 402 includes a passive funding instrument retrieval request 404 to request user approval for passive funding instrument retrieval, and an active funding instrument addition button 410 for a user to manually input new active funding instruments (e.g., a new credit card, a new bank account) to be linked in the present payment application (e.g., "PAYPAL").

In the example of FIG. 4, the passive funding instrument retrieval request 404 includes a passive funding instrument retrieval message 406 requesting user approval for passive funding instrument retrieval. A user may select the button 406 (e.g., "YES") to approve passive funding instrument retrieval, and select the button 408 (e.g., "NO") to deny passive funding instrument retrieval. In some embodiments, the user may pre-approve retrieval of passive funding instruments from the user device 200, such as stored directly on the device or through an application stored on the device, or from storage outside ones associated with the service provider. As a result, the service provider may automatically retrieve one or more passive funding instruments without any user action, which improves the transaction flow for the user and results in less communication needed between the service provider and the user, thereby saving computing resources. Furthermore, the pre-approval may include conditions, such as set by the user, of what passive funding instruments may be retrieved based on various transaction data, such as amount, type of purchase (e.g., only retrieve a certain funding instrument when the purchase is for travel or food, or even when the purchase is for travel on a certain airline or stay at a certain hotel). In an example, a passive funding instrument may be retrieved from a travel application (e.g., "EXPEDIA") on the user device based on a purchase type for traveling. In another example, a passive funding instrument may be retrieved from a particular hotel application (e.g., "HYATT") based on a purchase type for booking a room at that particular hotel.

Figure 5:
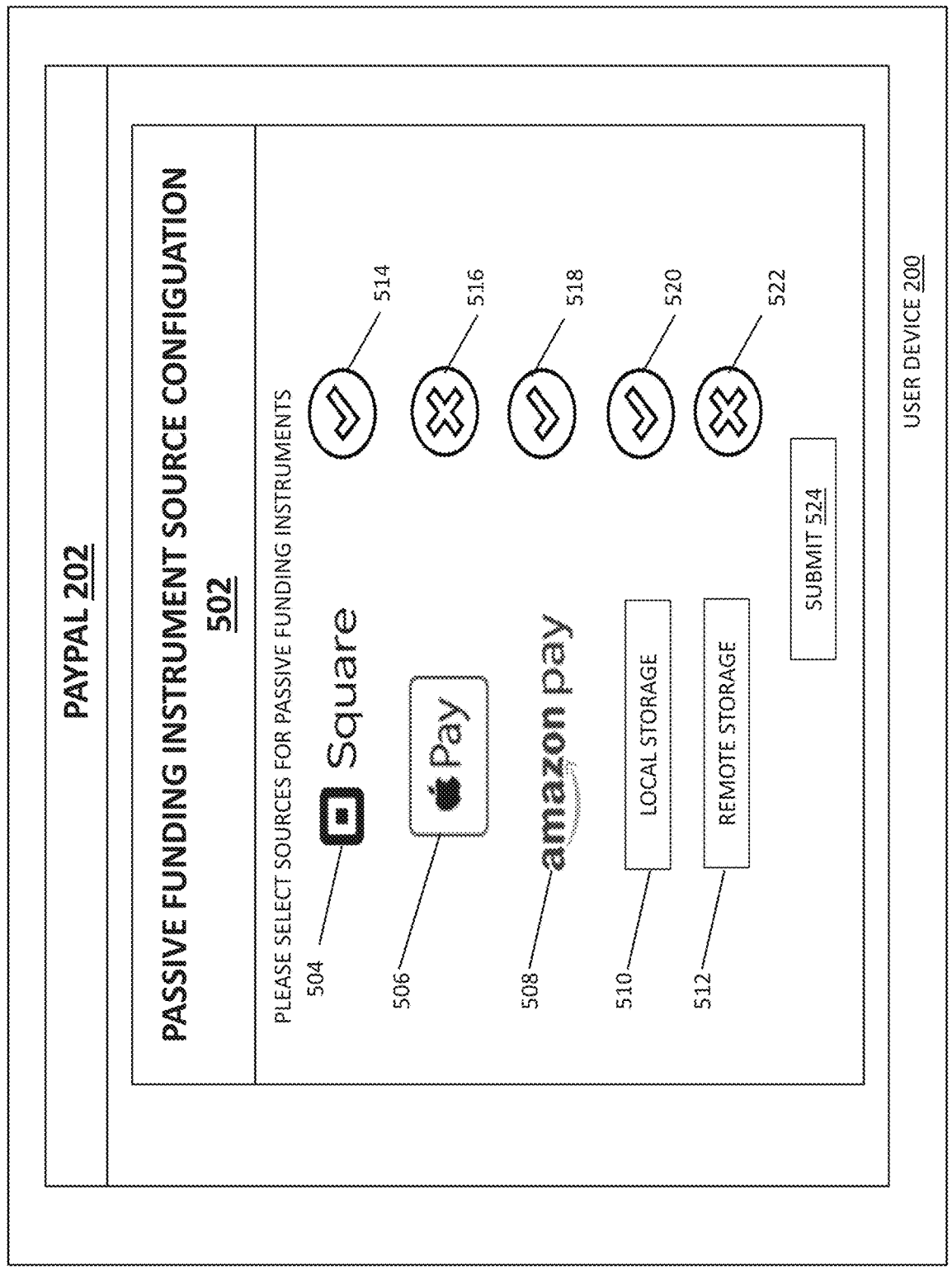
FIG. 5 illustrates a user device displaying a passive funding instrument selection screen in accordance with an embodiment.

The method 100 may proceed to block 108, where the system provider device determines one or more passive funding instrument sources. Referring to FIG. 5, a passive funding instrument source configuration screen 502 is displayed on a display device 202 of the user device 200. The additional funding instrument configuration screen 402 includes possible passive funding instrument sources 504, 506, 508, 510, and 512. For example, passive funding instrument sources 504 (e.g., "SQUARE"), 506 (e.g., "APPLE PAY"), and 508 (e.g., "AMAZON PAY") are determined (e.g., by the system provider device and/or the user device 200) based on other applications installed on the user device 200 and/or associated with the user. Each of these passive funding instrument sources 504, 506, and 508 may be provided by a respective payment system provider device. For further example, passive funding instrument sources 510 (e.g., "LOCAL STORAGE") and 512 (e.g., "REMOTE STORAGE") may be associated with a local storage device (e.g., a local memory) of the user device 200 and with a remote storage device (e.g., a remote storage device connected through a network). A user may select one or more passive payment instrument sources (e.g., passive funding instrument sources 504, 508, and 510) using selection inputs 514, 516, 518, 520, and 522. The user may submit the passive payment instrument source selection by selecting the submit button 524. In other embodiments, the passive funding instrument sources 504 may be retrieved from various applications where a funding instrument may be stored, such as an airline application, a hotel application, a travel application, a shopping or merchant application, a ticket application, and the like.

Figure 6:
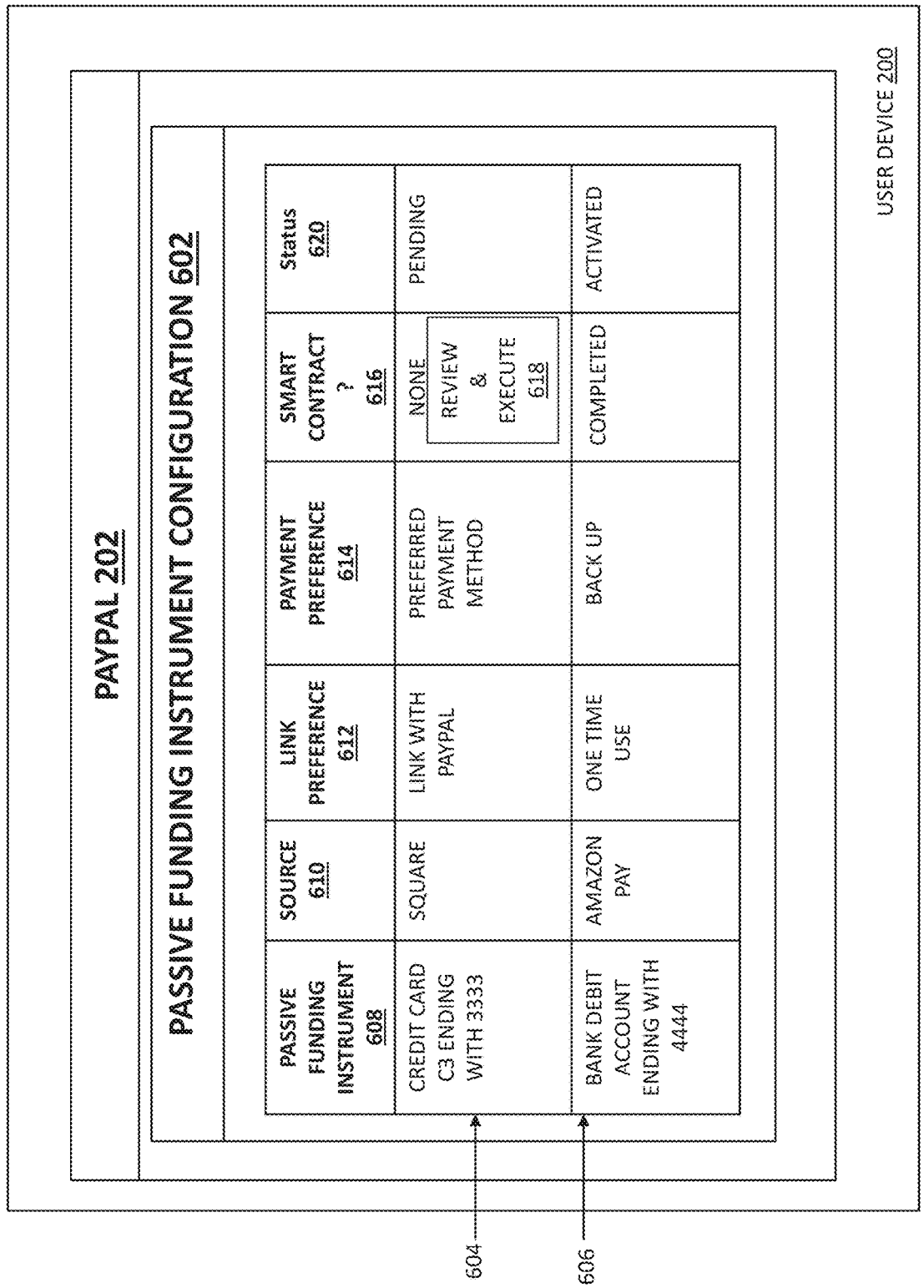
FIG. 6 illustrates a user device displaying a passive funding instrument configuration screen in accordance with an embodiment.

The method 100 may proceed to block 110, where the system provider device may retrieve passive funding instruments from the passive funding instrument sources, and determine a first passive funding instrument to be used for the payment request. Referring to FIG. 6, a passive funding instrument configuration screen 602 is displayed on a display device 202 of the user device 200. The passive funding instrument configuration screen 602 includes passive funding instrument configurations 604 and 606. As described in detail below, the system provider device may determine a passive funding instrument 608 (e.g., "CREDIT CARD C3 ENDING WITH 3333") of the passive funding instrument configuration 604 for the payment request based on the passive funding instrument configurations. The passive funding instrument configuration 604 includes a passive funding instrument 608 (e.g., "CREDIT CARD C3 ENDING WITH 3333") retrieved by the system provider device from a passive funding instrument source 610 (e.g., "SQUARE"). In the example of FIG. 6, a user configures the passive funding instrument configuration 604 with a link preference 612 (e.g., "LINK WITH PAYPAL") indicating that the user agrees to link the particular passive funding instrument 608 with the system provider device, such that the particular passive funding instrument 608 of the passive funding instrument configuration 604 may be used for this payment request and future payment requests by the system provider device. The user also configures the passive funding instrument configuration 604 with a payment preference 614 (e.g., "PREFERRED PAYMENT METHOD") indicating that the user prefers to use the particular passive funding instrument 608 of the passive funding instrument configuration 604 first as a payment method for a payment request. As discussed above, the selection and linking may be done by the user prior to the current transaction, such as during account set up or any time subsequent, so that these steps would not be required of the user in this or a subsequent transaction where one or more passive funding instruments are needed to fully fund a transaction.

In the example of FIG. 6, the passive funding instrument configuration 604 includes a smart contract field 616 (e.g., "NONE") indicating that a smart contract associated with the corresponding passive funding instrument (e.g., between the system provider device, the payment provider device associated with the passive funding instrument source 610 (e.g., "SQUARE"), and the user) has not been executed. A smart contract is a computer protocol intended to digitally facilitate, verify, or enforce the negotiation or performance of a contract. Smart contracts allow the performance of credible transactions without third parties. These transactions are trackable and irreversible. Various byzantine fault-tolerant algorithms may be used to allow digital security through decentralization to form smart contracts. In some examples, blockchains techniques may be used to enable the creation of custom sophisticated logic for a smart contract, and a blockchain-based smart contract is visible to all members (e.g., the system provider device, the payment provider device associated with the passive funding instrument source 610 (e.g., "SQUARE"), and the user device

200) of said blockchain. A user may select the button 618 ("REVIEW & EXECUTE") to initiate the creation and execution of a smart contract for the passive funding instrument 608 of the passive funding instrument configuration 604. The passive funding instrument configuration 604 includes a status 620 ("PENDING") indicating that the corresponding smart contract has not been executed, and the corresponding passive funding instrument is not ready for the payment request yet.

The passive funding instrument configuration 606 includes a passive funding instrument 608 (e.g., "BANK DEBIT ACCOUNT ENDING WITH 4444") retrieved by the system provider device from a passive funding instrument source 610 (e.g., "AMAZON PAY"). In the example of FIG. 6, a user configures the passive funding instrument configuration 606 with a link preference 612 (e.g., "ONE TIME USE") indicating that the particular passive funding instrument 608 is to be used for the present payment request only, and is not to be permanently linked with the system provider device for future payment requests. The user also configures the passive funding instrument configuration 604 with a payment preference 614 (e.g., "BACKUP") indicating that the user prefers to use the particular passive funding instrument 608 of the passive funding instrument configuration 606 as a backup payment method.

In the example of FIG. 6, the passive funding instrument configuration 604 includes a smart contract field 616 (e.g., "COMPLETED") indicating that a corresponding smart contract has been executed (e.g., using a blockchain including the system provider device, the payment provider device associated with the passive funding instrument source 610 (e.g., "AMAZON PAY"), and the user device 200). The passive funding instrument configuration 606 includes a status 620 ("ACTIVATED") indicating that the corresponding smart contract has been executed, and the corresponding passive funding instrument 608 is activated for use in the payment request.

The method 100 may proceed to block 114, where a smart contract associated with the first passive funding instrument is generated and executed, and the status of the first passive funding instrument is updated. In the example of FIG. 6, the smart contract for the passive funding instrument configuration 604 may be generated by a decentralized blockchain including the system provider device, the payment provider device associated with the passive funding instrument source 610 (e.g., "SQUARE"), and the user device 200. In some examples, after the smart contract is executed, the system provider device updates the status of the corresponding first passive funding instrument, e.g., by changing the status from "PENDING" to "ACTIVATED," indicating that the passive funding instrument 608 of the passive funding instrument configuration 604 is ready for use for the payment request. Again, the execution or agreement of the smart contract may be done before the current transaction, such as during account set up or any time prior to the transaction, where the smart contract is effective for all subsequent transactions or will expire within a certain time frame, which the user can then renew if desired. In that case, the above operations may be omitted, which improves the experience for the user and saves computing resources due to reduced electronic communications between the service provider device and the user device.

In some embodiments, accessing an executed smart contract results in fetching metadata associated with facts and terms of that executed smart contract. In an example, the metadata may include a token identifier or a token unique number (e.g., "123BH&78h6793"), identifier for the passive funding instrument source (e.g., "AMAZON"), the passive funding instrument identifier (e.g., "C2"), user device identifier for the user device 200, geolocation of the user device 200, currency type (e.g., "$"), deficit amount (e.g., "$10"), form factor (e.g., one of Mobile, Web, Mobile Web, In-store), authorization mode (e.g., "PIN"), etc. In some examples, terms of the executed smart contract may be determined dynamically based on the fetched metadata. In a particular example, smart contract terms are determined based on the fetched metadata, which provide for passively fetching for the deficit amount (e.g., "$10") using the passive funding instrument (e.g., "C2") associated with the passive funding instrument source (e.g., "AMAZON"), where User's consent to auto fetch passively is Yes.

Figure 7:
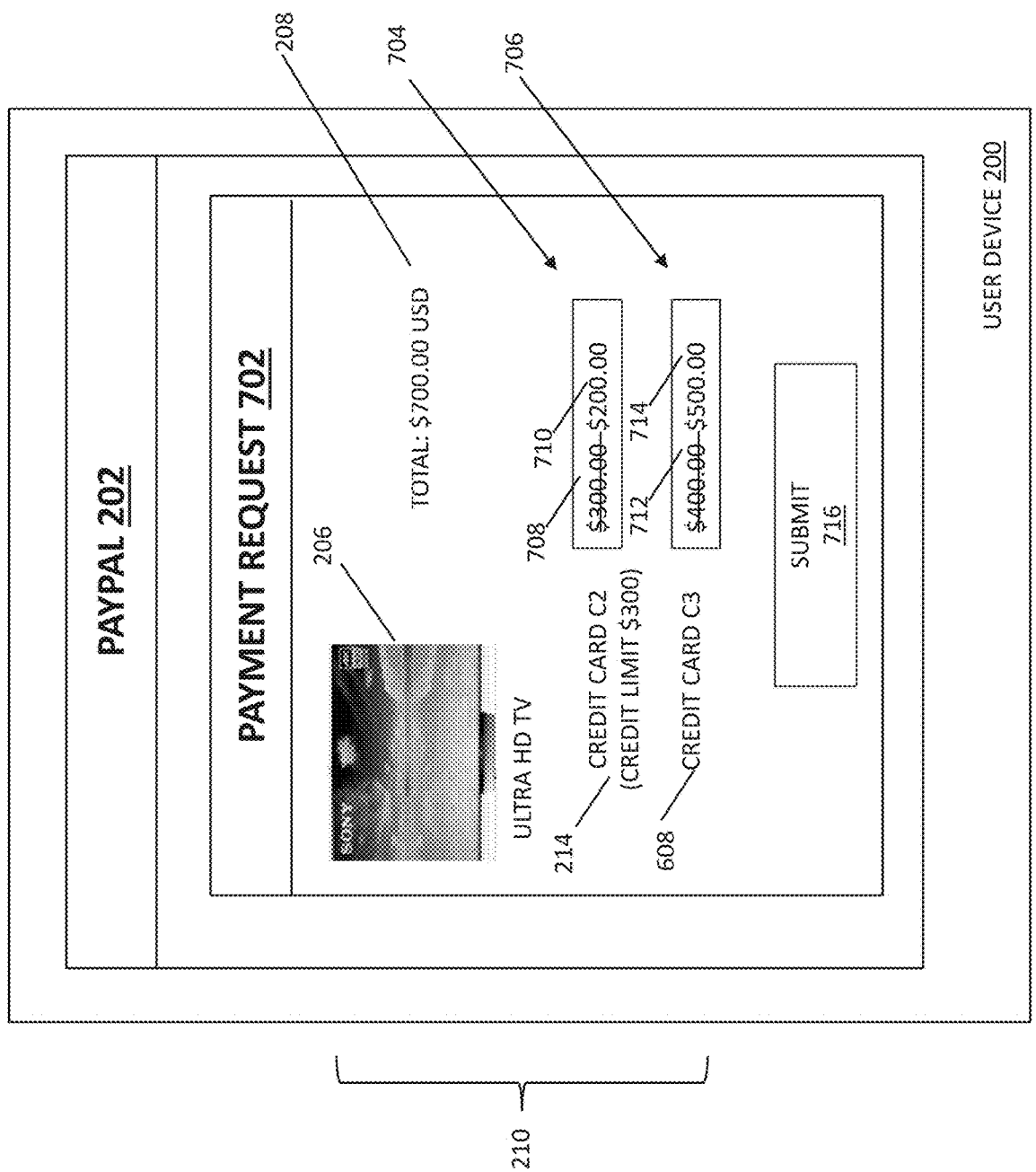
FIG. 7 illustrates a user device displaying a payment request screen in accordance with an embodiment.

The method 100 proceeds to block 116, where the system provider device processes a first sub-payment request including a first active funding instrument and a second sub-payment request including the first passive funding instrument. Referring to FIG. 7, illustrated is an example of a payment request screen 702 displayed on a display device 202 of a user device 200 associated with a user. In the particular illustrated example of FIG. 7, the payment request screen 702 illustrates that for the payment request 210 (e.g., with a payment amount 208 of 700.00 USD), the system provider device generates two sub-payment requests 704 and 706. The sub-payment request 704 includes an active funding instrument 214 (e.g., "CREDIT CARD C2") and a default payment amount 708 (e.g., "300.00 USD") that is the same as its credit limit. Correspondingly, the sub-payment request 706 includes a passive funding instrument 608 (e.g., "CREDIT CARD C3") that now has an "ACTIVATED" status, and a default payment amount 712 (e.g., "$400.00 USD") that is equal to the shortage of the active funding instrument 214.

In the example of FIG. 7, the user may change the payment amounts for sub-payment requests. For example, the sub-payment request 704 has a payment amount 710 (e.g., "$200.00 USD"), and the sub-payment request 706 has a payment amount 714 (e.g., "500.00 USD") to make up for the shortage.

A user may select the "SUBMIT" button 716 for the system provider device to process the sub-payment requests 704 and 706. For example, the system provider device may tokenize the sub-payment request 704 and send the resulting sub-payment request token to a corresponding token provider device (e.g., a credit card service provider) associated with the active funding instrument 214. For further example, the system provider device may tokenize the sub-payment request 706 and send the resulting sub-payment request token to a corresponding token provider device (e.g., a credit card service provider) associated with the passive funding instrument 608.

It is noted that while both a sub-payment request associated with an active funding instrument and a sub-payment request associated with a passive funding instrument are used in the example of FIG. 7, the system provider device may use different configurations of sub-payment requests based on the allocated payment amounts for the funding instruments (active and/or passive). In an example, the system provider device may use sub-payment request(s) with only passive funding instrument(s). In another example, the system provider device may use sub-payment request(s) with only active funding instrument(s). It is also noted that the user may not need to provide any input or action regarding any sub-payments, such that when the user submits a payment request for a transaction, the service provider determines one or more passive funding sources, processes the payment for the transaction using at least one of the passive funding sources, and notifies the user that the payment has been processed and the transaction completed. As discussed herein, this flow, where the user pre-sets or pre-authorizes retrieval and use of passive funding sources, provides advantages to both the service provider and user, such as requiring less computing resources for communication between the two, less time to process and complete a transaction, and less input needed by the user.

Figure 8:
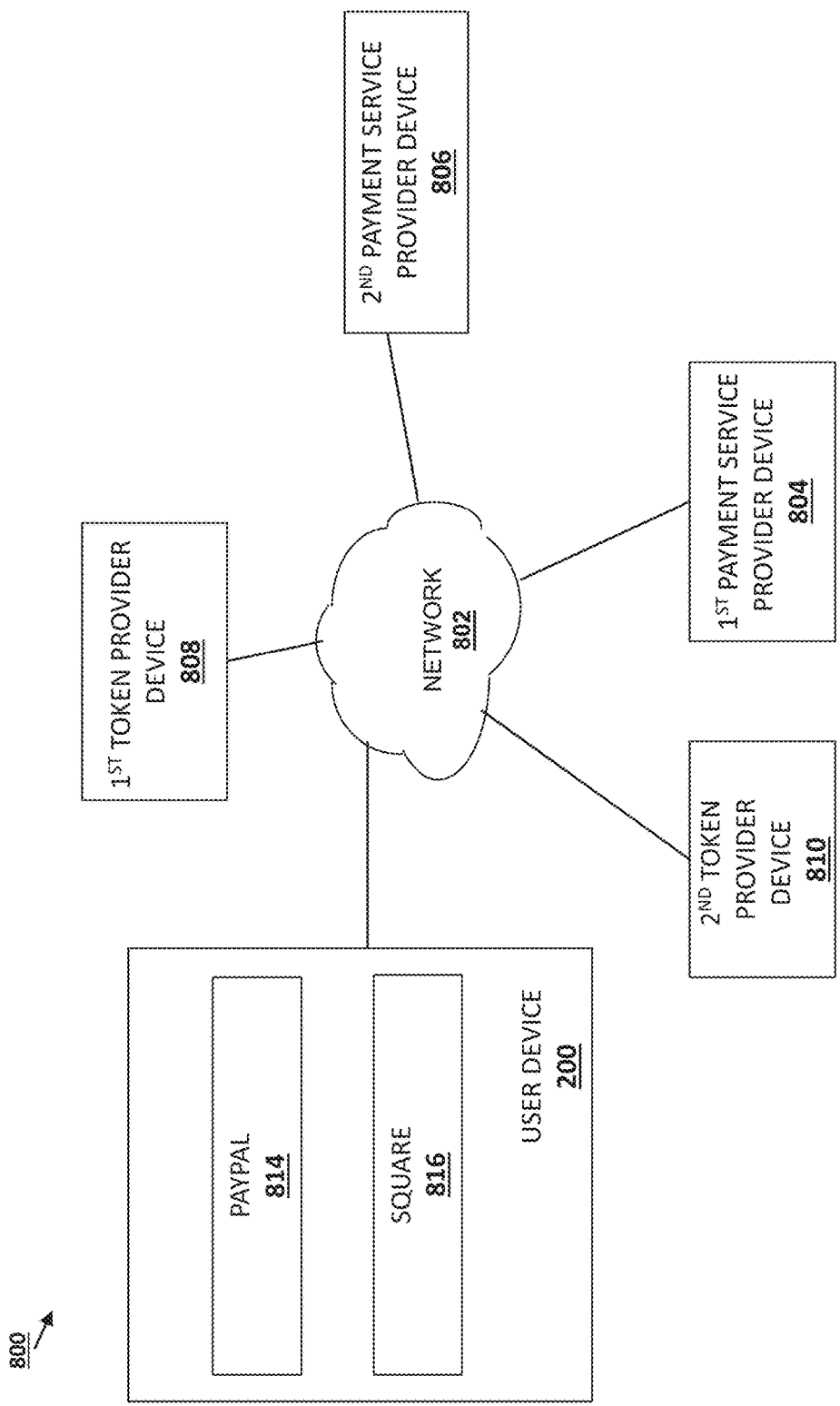
FIG. 8 illustrates a payment system in accordance with an embodiment.

The method 100 may proceed to block 118, where the system provider device receives sub-payment request success messages and determines that that payment request is successful. Referring to FIG. 8, a payment system 800 is illustrated. The payment system 800 includes a system provider device 804 (also referred to as $1^{st}$ payment service provider device 804) associated with the PAYPAL application 814 on the user device 200, and a second payment service provider device 806 associated with the SQUARE application 816 on the user device 200. During block 118, the system provider device may receive a sub-payment request success message (e.g., in a form of a token) from a first token provider device 808 associated with the sub-payment request 704, and a sub-payment request success message (e.g., in a form of a token) from a second token provider device 810 associated with the sub-payment request 706. In an example, after receiving sub-payment request success messages for all the sub-payment requests, the system provider device determines that the payment request 210 is successful. In another example, the system provider device may determine that the payment request 210 is not successful if sub-payment request success messages for only some but not all of the sub-payment requests are received.

Figure 9:
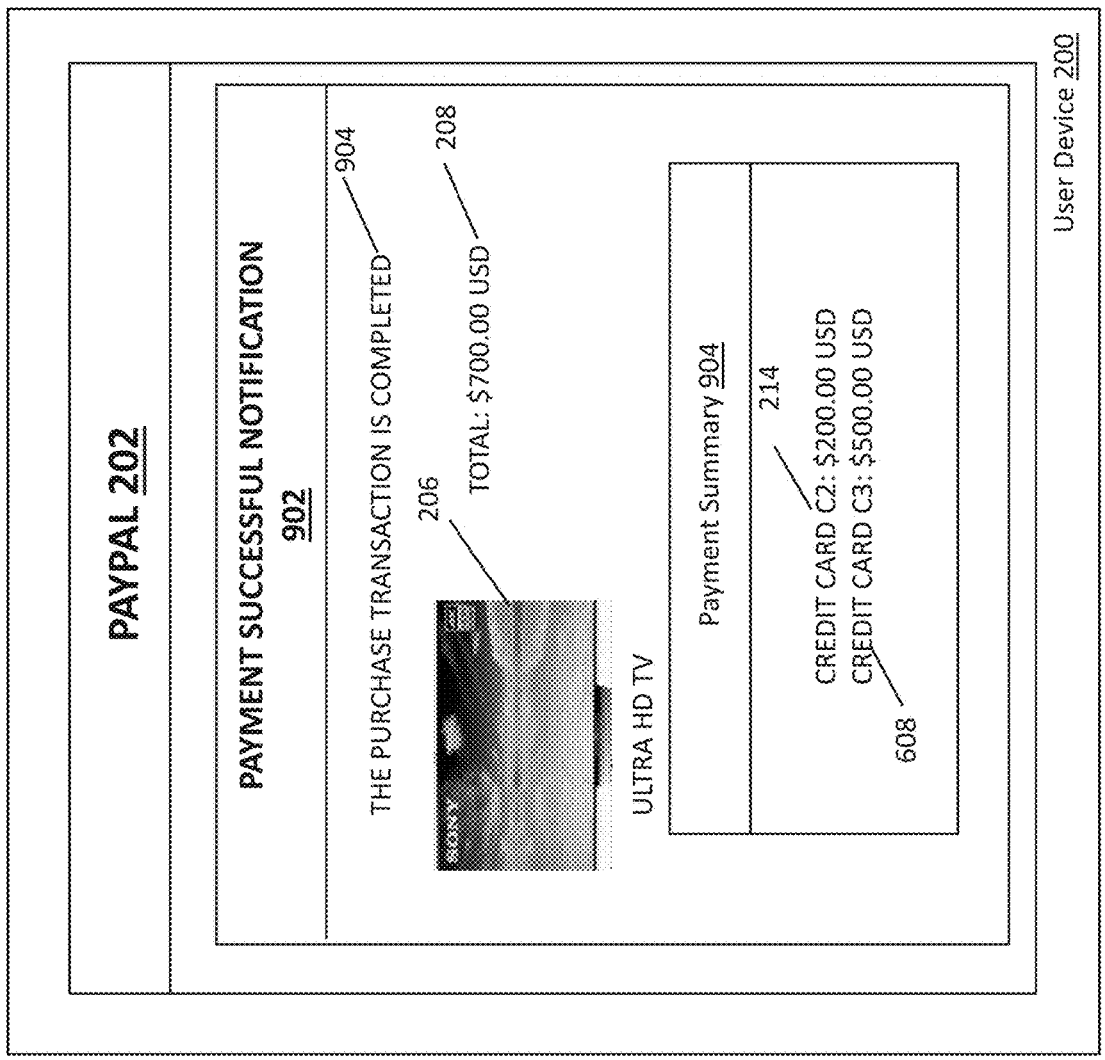
FIG. 9 illustrates a user device displaying a payment transaction completion notification screen in accordance with an embodiment.

The method 100 may proceed to block 120, where the system provider device generates a payment successful notification message and causes the payment success notification message to be displayed on the user device. Referring to FIG. 9, illustrated is an example of a payment successful screen 902 displayed on a display device 202 of a user device 200 associated with a user. The payment successful screen 902 includes a payment successful message 904 indicating that the payment request 210 and its associated transaction are successful. The payment successful screen 902 also includes a payment summary message 904 indicating the respective payment amounts for the active funding instrument 214 and passive funding instrument 608 (e.g., based on tokens of the respective sub-payment successful messages).

It is noted that while online transactions (e.g., a payment transaction, transactions for taking an online course, playing computer games, viewing digital content such as news/blogs, shopping) are used as examples for payment transactions using active and passive funding instruments, the method 100 may be used to improve payment techniques for any electronic communication.

Thus, systems and methods for providing secure electronic transmission have been described that operate to provide users, system providers, and various third-party service providers a secure communication system that may apply modification rules to perform additional modifications to encrypted messages for improved security. By applying the additional modification to the encrypted message and communicating the encrypted message, a secret key, and the modification rules using different communication channels, the difficulty for attackers to break the cryptography is increased. Furthermore, the modification rules may be changed dynamically (e.g., based on transmission security levels, a predetermined rotation frequency, network properties, transaction properties, transmission security risks, etc.), which further improves the security of the information transmission. Additionally, in some embodiments, a less complicated modification rule or no modification rule is applied with transmissions having a lower security risk or a lower transmission security level, and a more complicated modification rule is applied for transmissions having a higher security risk or a higher transmission security level, which reduces process time and improve system operating efficiency.

Figure 10:
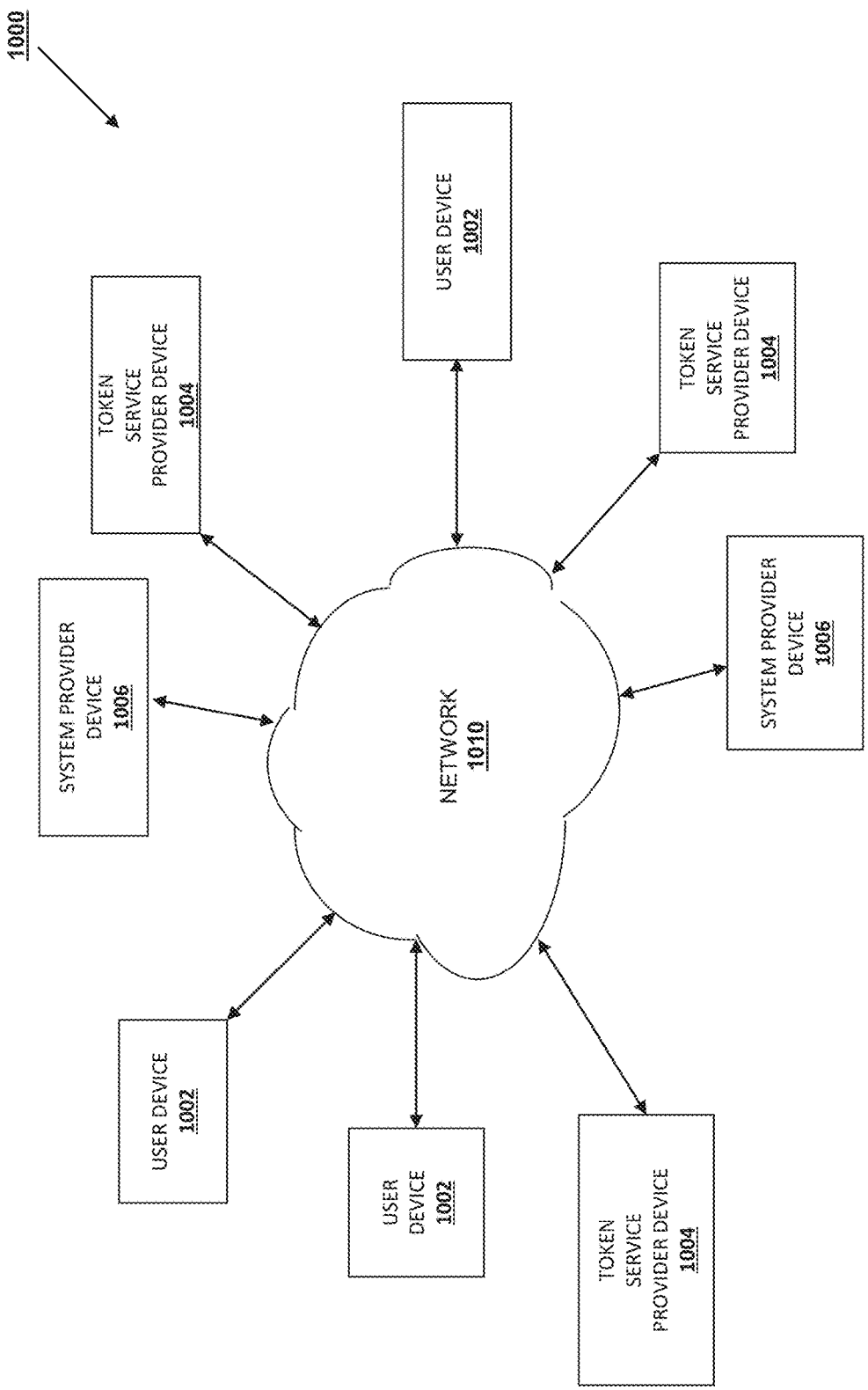
FIG. 10 is a schematic view illustrating an embodiment of a networked system.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes one or more user devices 1002, one or more system provider devices 1006, and one or more token service provider devices 1004 in communication over a network 1010. Any of the user devices 1002 may be a user device 202 discussed above. The system provider device 1006 may be a payment service provider device 804 or 806 discussed above and may be operated by a system provider such as, for example, PayPal Inc. of San Jose, Calif. The token service provider device 1004 may be a token service provider device 808 or 810 discussed above, and may be a service provider device providing token services and operated by various service providers including payment service providers, discount providers, marketplace providers, and/or any other service providers.

The user devices 1002, system provider devices 1006, and token service provider devices 1004 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The user device 1002 may be implemented using any appropriate combination of hardware and/or software configured for wired and/or wireless communication over network 1010. For example, in one embodiment, the user device 1002 may be implemented as a personal computer of a user in communication with the Internet. In some embodiments, the user device 1002 may be a wearable device. In some embodiments, the user device 1002 may be a smartphone, personal digital assistant (PDA), laptop computer, and/or other types of computing devices.

The user device 1002 may include one or more browser applications which may be used, for example, to provide a convenient interface to permit the customer to browse information available over the network 1010. For example, in one embodiment, the browser application may be implemented as a web browser configured to view information available over the Internet.

The user device 1002 may also include one or more toolbar applications which may be used, for example, to provide user-side processing for performing desired tasks in response to operations selected by the customer. In one embodiment, the toolbar application may display a user interface in connection with the browser application.

The user device 1002 may further include other applications as may be desired in particular embodiments to provide desired features to the user device 1002. In particular, the other applications may include an online payment transaction application provided by an online payment transaction provider. The other applications may also include security applications for implementing user-side security features, programmatic user applications for interfacing with appropriate application programming interfaces (APIs) over the network 1010, or other types of applications. Email and/or text applications may also be included, which allow the customer to send and receive emails and/or text messages through the network 1010. The user device 1002 includes one or more user and/or device identifiers which may be implemented, for example, as operating system registry entries, cookies associated with the browser application, identifiers associated with hardware of the user device 1002, or other appropriate identifiers, such as a phone number. In one embodiment, the user identifier may be used by the system provider device 1006, and/or the token service provider device 1004 associate the user with a particular account as further described herein.

Figure 11:
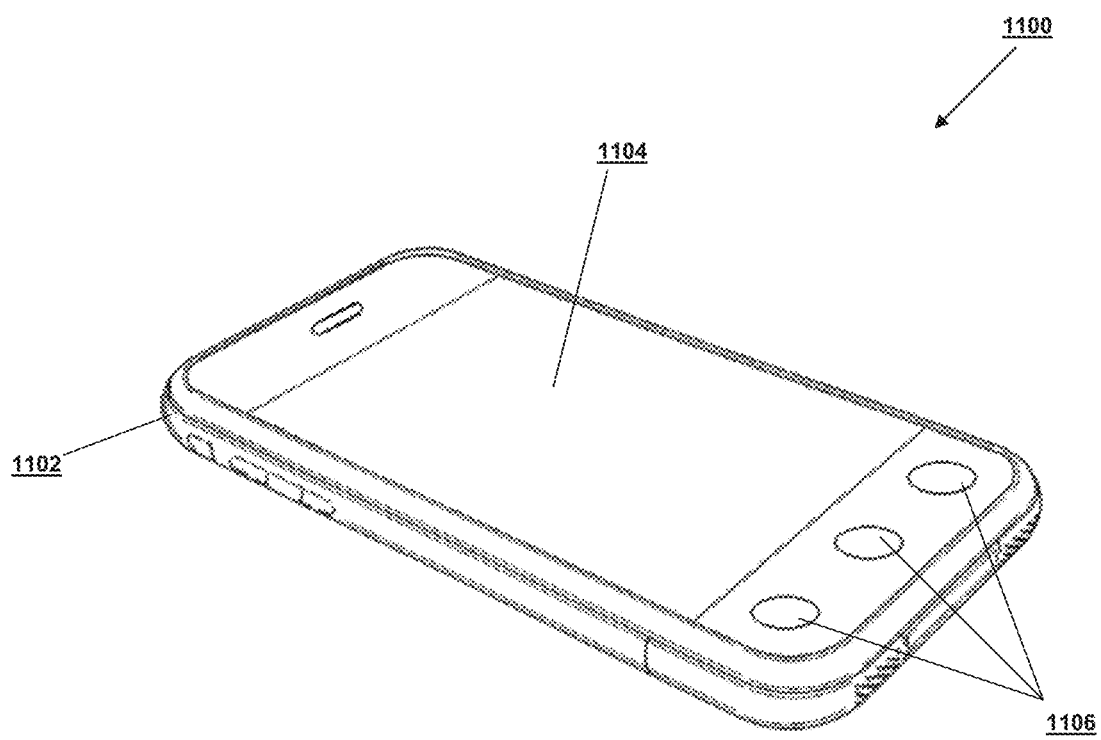
FIG. 11 is a perspective view illustrating an embodiment of a user device.

Referring now to FIG. 11, an embodiment of a user device 1100 is illustrated. The user device 1100 may be the user device 200. The user device 1100 includes a chassis 1102 having a display 1104 and an input device including the display 1104 and a plurality of input buttons 1106. One of skill in the art will recognize that the user device 1100 is a portable or mobile phone including a touch screen input device and a plurality of input buttons that allow the functionality discussed above with reference to the method 100. However, a variety of other portable/mobile customer devices may be used in the method 100 without departing from the scope of the present disclosure.

Figure 12:
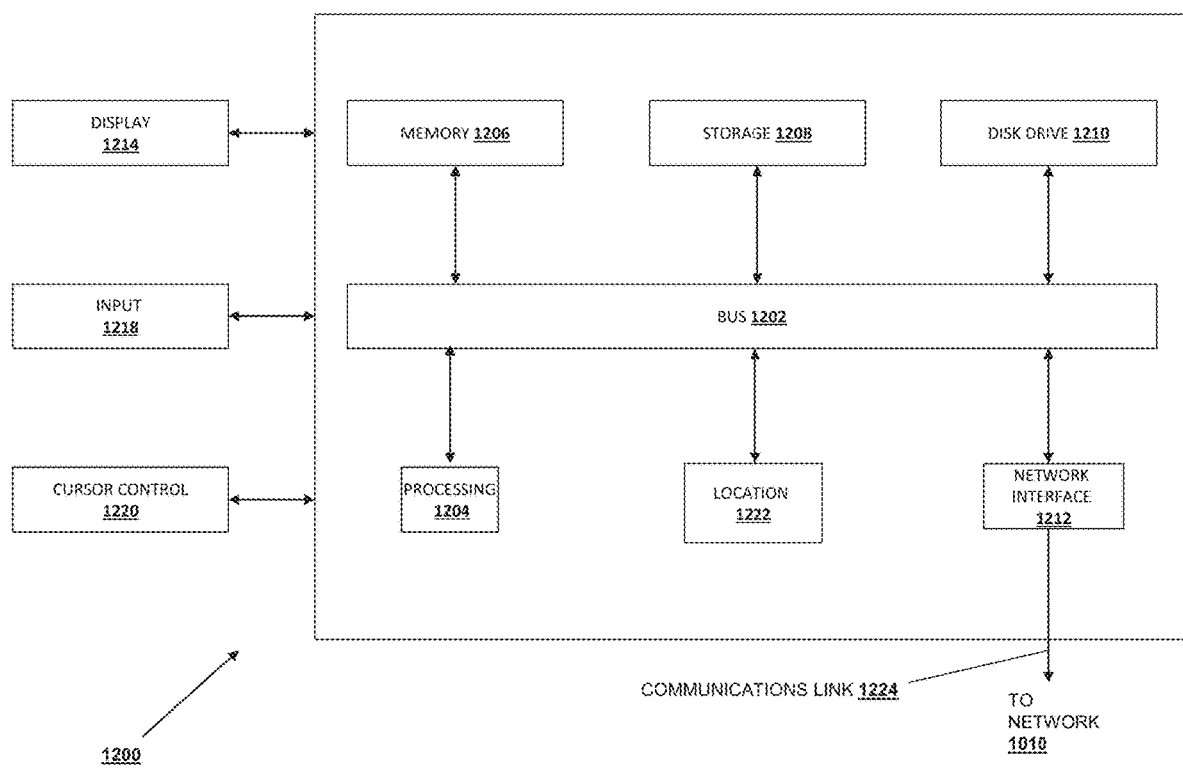
FIG. 12 is a schematic view illustrating an embodiment of a computer system.

Referring now to FIG. 12, an embodiment of a computer system 1200 suitable for implementing, for example, user device 200 or 1002, system provider device 804, 806, or 1006, and/or token service provider devices 808, 810, or 1004 is illustrated. It should be appreciated that other devices utilized by users, system providers, third-party user information providers, third party service providers, and/or system providers in the system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and a location sensor component 1222 (e.g., a Global Positioning System (GPS) device as illustrated, a cell tower triangulation device, and/or a variety of other location determination devices known in the art). In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to user device 200 or 1002, system provider device 804, 806, or 1006, and/or token service provider devices 808, 810, or 1004. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
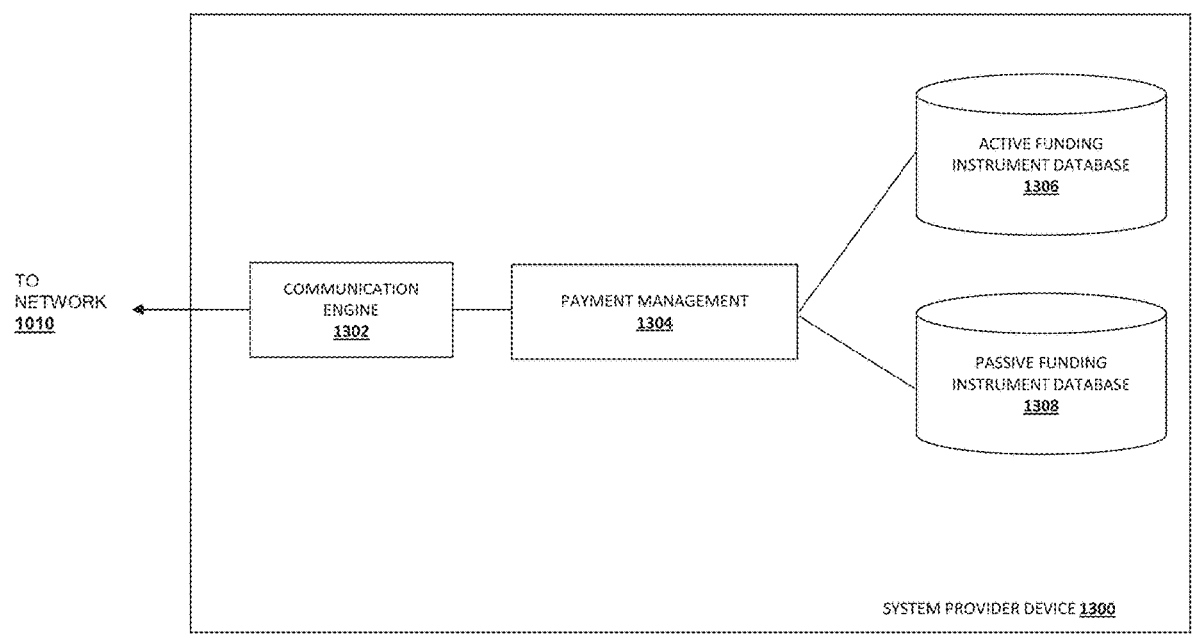
FIG. 13 is a schematic view illustrating an embodiment of a device that may be used as a system provider device.

Referring now to FIG. 13, an embodiment of a device 1300 is illustrated. In an embodiment, the device 1300 may be a system provider device 804, 806, or 1006 discussed above. The device 1300 includes a communication engine 1302 that is coupled to the network 1010 and to a payment management engine 1304 that is coupled to an active funding instrument database 1306 and a passive funding instrument database 1308. The communication engine 1302 may be software or instructions stored on a computer-readable medium that allows the device 1300 to send and receive information over the network 1010. The payment management engine 1304 may be software or instructions stored on a computer-readable medium that is operable to perform operations including processing a payment request received from a user device and associated with a first funding instrument; receiving, a payment request failed message associated with the payment request; retrieving a second funding instrument associated with a second payment service provider device; processing a first sub-payment request of the payment request associated with the second funding instrument; receiving a first sub-payment successful message associated with the first sub-payment request; determining that the payment request is successful based on the first sub-payment successful message; and providing, to the user device, a payment request successful message indicating that the payment request is successful. The operations may also provide any of the other functionality that is discussed above. While the databases 1306 and 1308 have been illustrated as separate databases and located in the device 1300, one of skill in the art will recognize that the databases 1306-1308 may be combined and/or may be connected to the secure communication engine 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
processing, by a first payment service provider device, a payment request received from a mobile user device and associated with a use of a first funding instrument for a payment, the first funding instrument linked to a first mobile payment application installed on the mobile user device and from which the payment request was received;
receiving, by the first payment service provider device, a payment request failed message indicating that the first funding instrument cannot be used for the payment request;
in response to receiving the payment request failed message indicating that the first funding instrument cannot be used for the payment request, automatically fetching metadata from a smart contract recorded in a blockchain and associated with a second mobile payment application installed on the mobile user device, wherein the smart contract comprises a computer protocol that defines a logic for digitally facilitating a passive retrieval of a second funding instrument for use in the payment request;
based on the metadata, identifying a token identifier corresponding to the second funding instrument, wherein the second funding instrument is linked to the second mobile payment application but not linked to the first mobile payment application;
retrieving, by the first payment service provider device and from a storage device associated with the second mobile payment application, information corresponding to the second funding instrument linked to the second mobile payment application based on the token identifier;
in response to the receiving the payment request failed message and the retrieval of the information corresponding to the second funding instrument, processing, by the first payment service provider device, a first sub-payment request of the payment request associated with a use of the second funding instrument for the payment;
receiving, by the first payment service provider device, a first sub-payment successful message associated with the first sub-payment request;
determining, by the first payment service provider device, that the payment request was successful based on the first sub-payment successful message; and
providing, to the mobile user device, a payment request successful message indicating that the payment request was successful.

2. The system of claim 1, wherein the payment request failed message indicates that the first funding instrument is not available, and
wherein the payment request and first sub-payment request have a same payment amount.

3. The system of claim 1, wherein the payment request failed message indicates that the first funding instrument has an amount limit less than a total payment amount of the payment request, and
wherein the operations further comprise:
processing, by the first payment service provider device, a second sub-payment request of the payment request associated with the first funding instrument and a second payment amount that is a difference between the total payment amount and a first payment amount of the first sub-payment request.

4. The system of claim 3, wherein the operations further comprise:
receiving, by the first payment service provider device, a second sub-payment successful message associated with the second sub-payment request; and
determining, by the first payment service provider device, that the payment request is successful based on the first sub-payment successful message and second sub-payment successful message.

5. The system of claim 1, wherein the operations further comprise:
accessing the smart contract via a blockchain.

6. The system of claim 5, wherein the blockchain is a consortium chain associated with the first payment service provider device, a second payment service provider device, and the mobile user device.

7. The system of claim 1, wherein the first sub-payment successful message includes a token,
wherein the payment request successful message is generated based on the token.

8. A method, comprising:
receiving, by a first service provider, a first request for payment for a transaction conducted via a mobile computing device associated with a user having an account with the first service provider, the first request received from a first mobile application on the mobile computing device;
determining a first funding instrument linked to the account;
sending a first tokenized communication including a first amount for the transaction through a computer network to a first entity associated with the first funding instrument;
receiving a notification from the first entity that the first request has been declined;
in response to the receiving the notification from the first entity that the first request has been declined, fetching metadata from a smart contract recorded in a blockchain and associated with a second mobile application on the mobile computing device, wherein the smart contract comprises a computer protocol that defines a logic for digitally facilitating a passive retrieval of a second funding instrument for use in the transaction;

based on the metadata, identifying a token identifier corresponding to the second funding instrument, wherein the second funding instrument is linked to the second mobile application but not linked to the first mobile application;

retrieving information corresponding to the second funding instrument linked to the second mobile application based on the token identifier;

in response to the receiving the notification from the first entity that the first request has been declined and the retrieving the second funding instrument, sending a second tokenized communication including a second request for payment of the transaction using the second funding instrument and a second amount through a computer network to a second entity associated with the second funding instrument;

receiving a notification from the second entity that the second request has been approved; and notifying the user through the mobile computing device that the transaction has been approved.

9. The method of claim 8, wherein the first amount is a full amount for the transaction and the second amount is equal to or less than the full amount.

10. The method of claim 8, wherein the notification from the first entity further indicates an approval of a third amount less than a full amount.

11. The method of claim 10, wherein a sum of the second amount and the third amount equals the full amount.

12. The method of claim 8, further comprising:
prior to the retrieving the information corresponding to the second funding instrument, accessing the smart contract between the user and the first service provider stored in the blockchain, wherein the fetching the metadata is based on the accessing the smart contract.

13. The method of claim 8, wherein the second mobile application on the mobile computing device is associated with a second service provider.

14. The method of claim 8, wherein the information corresponding to the second funding instrument is retrieved from a non-transitory memory in the mobile computing device.

15. A non-transitory machine-readable medium having stored thereon machine-readable instructions executable to cause a machine to perform operations comprising:
receiving, by a first service provider, a request for payment for a transaction conducted via a first mobile application installed on a mobile computing device associated with a user having an account with the first service provider;
sending a first tokenized communication including a first amount for the transaction through a computer network to a first entity associated with a first funding instrument linked to the first mobile application;
receiving, from the first entity, a payment declined message associated with the first amount;
in response to the receiving the payment declined message, fetching metadata from a smart contract recorded in a blockchain and associated with a second mobile application installed on the mobile computing device, wherein the smart contract comprises a computer protocol that defines a logic for digitally facilitating a passive retrieval of a second funding instrument for use in the transaction;
based on the metadata, identifying a token identifier corresponding to second funding instrument, wherein the second funding instrument is linked to the second mobile application but not linked to the first mobile application;
retrieving information corresponding to the second funding instrument linked to the second mobile application based on the token identifier;
in response to the receiving the payment declined message and the retrieving the information corresponding to the second funding instrument, sending a second tokenized communication including a second amount for the transaction through a computer network to a second entity associated with the second funding instrument;
receiving from the second entity that the second amount has been approved; and
notifying the user through the first mobile application of the mobile computing device that the transaction has been approved.

16. The non-transitory machine-readable medium of claim 15, wherein the payment declined message indicates that the first funding instrument is not available, and
wherein the second amount is a full amount of the transaction.

17. The non-transitory machine-readable medium of claim 15, wherein the payment declined message further indicates an approval of a third amount less than a full amount, and
wherein the second amount is less than the full amount of the transaction.

18. The non-transitory machine-readable medium of claim 15, wherein the operations further comprise:
prior to the retrieving the information corresponding to the second funding instrument, accessing an the smart contract between the user and the first service provider stored in the blockchain, wherein the fetching the metadata is based on the accessing the smart contract.

19. The non-transitory machine-readable medium of claim 18, wherein the smart contract is further associated with a second service provider of the blockchain.

20. The non-transitory machine-readable medium of claim 15, wherein the second mobile application on the mobile computing device is associated with a second service provider.

* * * * *